(12) United States Patent (10) Patent No.: US 9,377,924 B2
Sailor et al. (45) Date of Patent: Jun. 28, 2016

(54) METHOD AND APPARATUS FOR USER INTERFACE DISPLAYS

(75) Inventors: Maulik Sailor, Sweetman Place (GB); Craig Pugsley, Paignton (GB); David Fishlock, Stokes Croft (GB); Daniel Puzey, Avon (GB); Christopher Rodwell, Chippenham (GB); Ben Buttigieg, Stoke Gifford (GB); Mike Roberts, Bradley Stoke (GB); Pramod Dhanwade, Avon (GB); Rishikesh Maktedar, Tampere (FI)

(73) Assignee: Nokia Technologies Oy, Espoo (FI)

( * ) Notice: Subject to any disclaimer, the term of this patent is extended or adjusted under 35 U.S.C. 154(b) by 721 days.

(21) Appl. No.: 12/945,612

(22) Filed: Nov. 12, 2010

(65) Prior Publication Data

US 2011/0145749 A1 Jun. 16, 2011

Related U.S. Application Data

(60) Provisional application No. 61/260,777, filed on Nov. 12, 2009.

(51) Int. Cl.
*G06F 3/00* (2006.01)
*G06F 3/0481* (2013.01)
*G06F 9/44* (2006.01)

(52) U.S. Cl.
CPC ............ *G06F 3/0481* (2013.01); *G06F 9/4443* (2013.01); *G06F 2203/04803* (2013.01)

(58) Field of Classification Search
CPC ............... G06Q 30/02; G06Q 30/0603; G06F 17/3002; G06F 17/30035; G06F 17/30038; G06F 17/30053; G06F 17/30696; G06F 17/30867; H04L 67/02

USPC ......... 715/772, 716, 727, 719, 717, 783, 788; 700/94; 386/238, 292

See application file for complete search history.

(56) References Cited

U.S. PATENT DOCUMENTS

| 7,250,955 | B1 * | 7/2007 | Beeman et al. ............... 345/592 |
| 8,176,514 | B2 * | 5/2012 | Yi .................................... 725/41 |
| 2003/0146939 | A1 * | 8/2003 | Petropoulos et al. ......... 345/810 |
| 2005/0183017 | A1 * | 8/2005 | Cain ............................... 715/719 |
| 2006/0195789 | A1 * | 8/2006 | Rogers et al. ................. 715/727 |
| 2007/0005694 | A1 * | 1/2007 | Popkin et al. ................ 709/204 |
| 2007/0287432 | A1 * | 12/2007 | Jung .......................... 455/414.1 |
| 2009/0013280 | A1 * | 1/2009 | Ballard ......................... 715/783 |

(Continued)

OTHER PUBLICATIONS

Windows Media Player CD-RIP (publised Apr. 4, 2008) http://web.archive.org/web/20080404173028/http://us.raidentunes.com/manual-windows-media-player-cd-rip.html.*

(Continued)

*Primary Examiner* — Jeffrey A Gaffin
*Assistant Examiner* — Rinna Yi
(74) *Attorney, Agent, or Firm* — Ditthavong & Steiner, P.C.

(57) ABSTRACT

An approach for providing a user interface display, for example, with a first window that includes a first predefined area to present a status display control and a second predefined area that is separately defined in the first window to present a status display related to the status display control. Further providing, for example, the user interface display with a second window that includes the first predefined area to present the status display control and a third area that transparently presents the status display over content in the second window upon selection of the status display control.

15 Claims, 17 Drawing Sheets

(56) References Cited

U.S. PATENT DOCUMENTS

2009/0047000 A1* 2/2009 Walikis et al. ............... 386/124
2009/0049385 A1* 2/2009 Blinnikka et al. ............ 715/719
2009/0217196 A1* 8/2009 Neff et al. .................... 715/799
2010/0058220 A1* 3/2010 Carpenter .................... 715/772

OTHER PUBLICATIONS

3 Free FTP Clients that make managing websites a breeze (published on Jan. 16, 2009) http://techtites.com/3-free-ftp-clients-that-make-managing-websites-a-breeze/.*

* cited by examiner

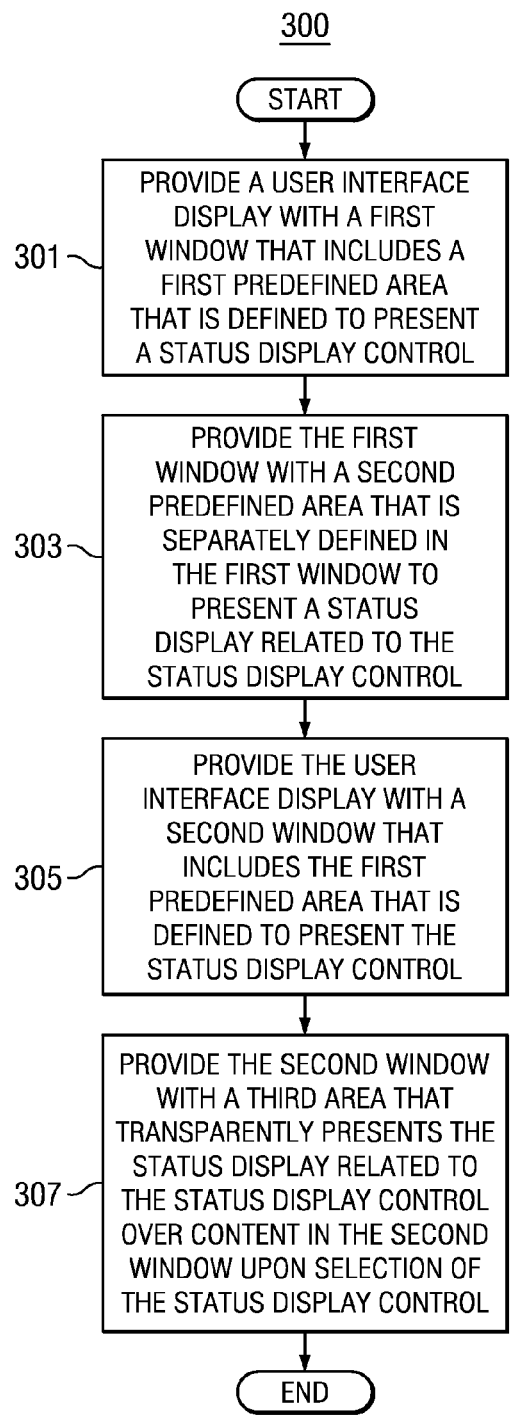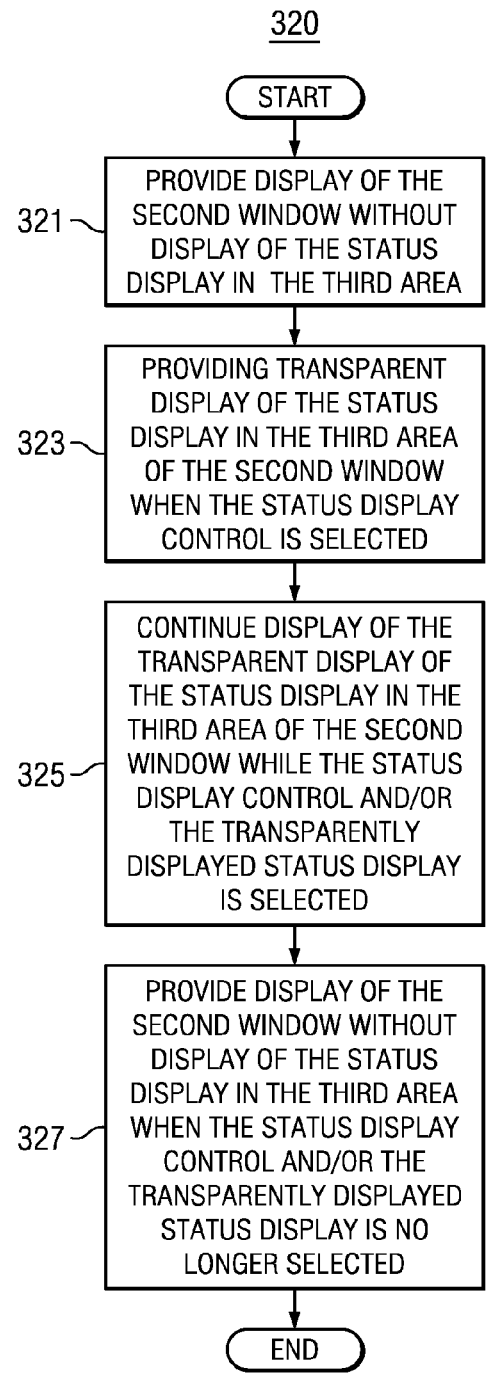
FIG. 3A
FIG. 3B

METHOD AND APPARATUS FOR USER INTERFACE DISPLAYS

RELATED APPLICATIONS

This application claims priority benefit to U.S. Provisional Patent Application No. 61/260,777, filed Nov. 12, 2009 and is hereby incorporated by reference in its entirety.

BACKGROUND

Service providers and device manufacturers are continually challenged to deliver value and convenience to consumers by, for example, providing compelling network services. Service providers can provide various user interface applications for use on user equipment that enhance the user's interface experience with the user equipment and when the user equipment is used to access various services offered by the service provider. However, currently available user interface applications have limitations and thus fail to provide the user with an interface that can allow for the user to fully appreciate and utilize the various services offered by the service provider.

SOME EXAMPLE EMBODIMENTS

Therefore, there is a need for an approach for improved user interfaces.

According to one embodiment, a method comprises providing a user interface display with a first window that includes a first predefined area that is defined to present a status display control and a second predefined area that is separately defined in the first window that is defined to present a status display related to the status display control, and providing the user interface display with a second window that includes the first predefined area that is defined to present the status display control and a third area that transparently presents the status display over content in the second window upon selection of the status display control.

According to another embodiment, an apparatus comprising at least one processor, and at least one memory including computer program code, the at least one memory and the computer program code configured to, with the at least one processor, cause, at least in part, the apparatus to perform at least the following, provide a user interface display with a first window that includes a first predefined area that is defined to present a status display control and a second predefined area that is separately defined in the first window that is defined to present a status display related to the status display control; and provide the user interface display with a second window that includes the first predefined area that is defined to present the status display control and a third area that transparently presents the status display over content in the second window upon selection of the status display control.

According to another embodiment, a computer-readable storage medium carrying one or more sequences of one or more instructions which, when executed by one or more processors, cause, at least in part, an apparatus to at least perform the following steps: providing a user interface display with a first window that includes a first predefined area that is defined to present a status display control and a second predefined area that is separately defined in the first window that is defined to present a status display related to the status display control; and providing the user interface display with a second window that includes the first predefined area that is defined to present the status display control and a third area that transparently presents the status display over content in the second window upon selection of the status display control.

According to another embodiment, an apparatus comprises means for providing a user interface display with a first window that includes a first predefined area that is defined to present a status display control and a second predefined area that is separately defined in the first window that is defined to present a status display related to the status display control; and means for providing the user interface display with a second window that includes the first predefined area that is defined to present the status display control and a third area that transparently presents the status display over content in the second window upon selection of the status display control.

According to one embodiment, a method comprises providing a user interface display with a functional control configured to perform a predetermined operation; receiving an actuation command regarding the functional control; providing a display panel on the user interface display configured to display progress of the predetermined operation for the functional control for the actuation command that was received; and providing the user interface display without display of the display panel.

According to another embodiment, an apparatus comprising: at least one processor; and at least one memory including computer program code, the at least one memory and the computer program code configured to, with the at least one processor, cause the apparatus to perform at least the following, provide a user interface display with a functional control configured to perform a predetermined operation; receive an actuation command regarding the functional control; provide a display panel on the user interface display configured to display progress of the predetermined operation for the functional control for the actuation command that was received; and provide the user interface display without display of the display panel.

According to another embodiment, a computer-readable storage medium carrying one or more sequences of one or more instructions which, when executed by one or more processors, cause an apparatus to at least perform the following steps: providing a user interface display with a functional control configured to perform a predetermined operation; receiving an actuation command regarding the functional control; providing a display panel on the user interface display configured to display progress of the predetermined operation for the functional control for the actuation command that was received; and providing the user interface display without display of the display panel.

According to another embodiment, an apparatus comprises means for providing a user interface display with a functional control configured to perform a predetermined operation; means for receiving an actuation command regarding the functional control; means for providing a display panel on the user interface display configured to display progress of the predetermined operation for the functional control for the actuation command that was received; and means for providing the user interface display without display of the display panel.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention.

Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3A is a flowchart of a process for providing a user interface display having a first window and a second window, according to one embodiment;

FIG. 3B is a flowchart of a process for providing a display of the second window of FIG. 3A, according to one embodiment;

DESCRIPTION OF SOME EMBODIMENTS

Figure 1:
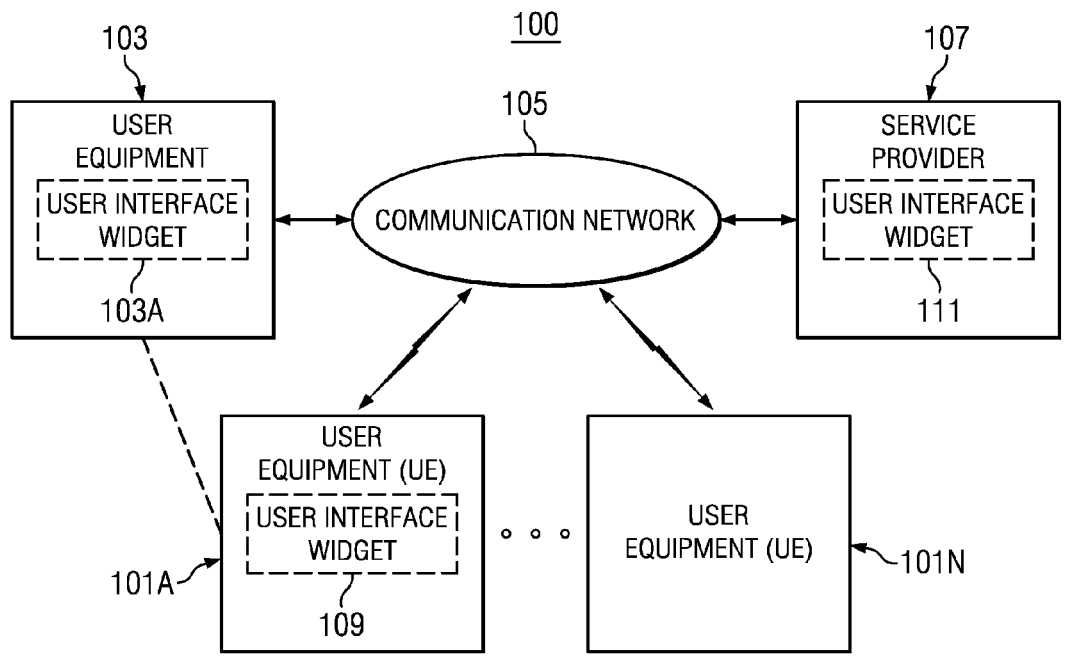
FIG. 1 is a diagram of a system capable of providing an improved user interface display, according to an embodiment.

Examples of a method, apparatus, and computer program for improved user interface displays are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to the use thereof on computers such as a personal computer or laptop, it is contemplated that the approach described herein may be used with any other type of user equipment and/or in conjunction with the use of on a server such as a service provider server or any other type of server.

Although various embodiments are described with respect to a playback queue, progress pane, download window, upload window, control button pane, etc., these are merely examples of a "general floating window" configuration disclosed herein.

According to one embodiment, a floating window/panel/pane/widget presentation, for example a "floating" playback queue/list or progress pane or control button pane, is provided in a user interface display (see, e.g., FIGS. 1-4C and 7-9), which allows a user to see main content window/panel/pane/widget in full display format in the user interface display, for example, the Ovi Music store in full-width and/or full-height user interface (UI) display, as well as manage functions included on the floating window/panel/pane/widget, such as the play queue easily. In Nokia Music, the user can either see "My Music" or "Store" view at a time. The "Play" queue allows a user to manage the playback. If the Play queue is shown in full width of the visible UI, then there is a problem of allowing a user to easily manage the Play queue without obstructing the store pages. Accordingly, the Play queue has been made to "float" in the Store tab. Thus, when in "My Music" view, the play queue is always visible. But when in "Ovi Music" view, the Play queue automatically collapses, thereby enabling full-width Store pages. The user can mouse-over (i.e. select) a control to expand the Play queue and interact with it. The Play queue automatically collapses again if the user moves the mouse pointer away from the queue (i.e., no longer selects). The player controls are moved outside the queue, so the user can control the playback with single click.

According to another embodiment, display panel, for example a progress pane, is provided in a user interface display (see, e.g., FIGS. 1-2 and 5A-9), which provides a user real-time progress information about progress of various operations. In Ovi Player, the user can invoke many different operations (e.g., importing of music, optimizing artwork, transfer music to devices, download new music, etc.) in parallel. It is advantageous to give progress information about these operations in a non-intrusive manner. Also, this solution is flexible to add/remove different operations. Thus, a user interface display is provided that displays the progress information in a separate floating progress panel. The progress pane may not visible by default, but rather becomes visible if any of the operations are invoked (i.e., import, artwork optimization, download, transfer, etc.). Also, the progress pane can close automatically when the operations are finished successfully. Any combination of these operations are supported. The user can have the panel open or collapsed. In Open mode, the panel gives detailed progress information about each operations. In Collapsed mode, the panel gives information about the remaining time required to complete all the ongoing operations. Errors states can also be reported. A user can adjust the height as required. Also, any preferences set by, or adjustments made to the panel by the user can be stored for use when the progress panel subsequently opens. The user interface display includes automatic resizing, such that as the progress of items are completed and are removed from the progress panel, the panel can automatically resize itself to a smaller or invisible view, down to a minimum size limit. If all operations are completed, then the progress panel can close.

FIG. 1 is a diagram of a system capable of providing an improved user interface display, according to an embodiment.

As shown in FIG. 1, the system 100 comprises a user equipment (UE) 101A ... 101N and 103 having connectivity to a communication network 105. Also a service provider server 107 is provided that is also connected to communication network 105. In this figure, UE 101A, UE 103, and service provider 107 are each shown as including a user interface widget 109, 103A, and 111, respectively; however, it is contemplated that such a widget need not be provided in each but rather it could alternatively be provided in one or any combination of more than one such apparatuses. By way of illustration and not limitation, UE 103 could be provided as a personal computer or laptop or notebook, etc. having ser interface widget 103A, and such UE 103 could provide the user interface displays described herein without the need for any other user interface widget. Thus, if a user is utilizing the user interface display on UE 103 and accessing services or products of service provider 107, the UE 103 can utilize the user interface widget 103A in order to provide such a display, or the user interface widget 111, or a combination thereof depending on whether the application being run is local or remote. Also, by way of illustration and not limitation, UE 103 is shown as being connected to UE 101A by a dashed line, which can be any form of wireless or wired connection, such as, for example, when a mobile device is connected with a computer for syncing, etc.

By way of example, the communication network 105 of system 100 includes one or more networks such as a data network (not shown), a wireless network (not shown), a telephony network (not shown), short range wireless network (not shown), broadcast network (not shown) or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), wireless LAN (WLAN), Bluetooth® network, Ultra Wide Band (UWB) network, and the like.

The UEs 101A . . . 101N and 103A is any type of mobile terminal, fixed terminal, or portable terminal including a mobile handset, station, unit, device, multimedia computer, multimedia tablet, Internet node, communicator, communication device, desktop computer, laptop computer, Personal Digital Assistants (PDAs), audio/video player, digital still/video camera, game device, analog/digital television broadcast receiver, analog/digital radio broadcast receiver, positioning device, or any combination thereof. It is also contemplated that the UE 101 can support any type of interface to the user (such as "wearable" circuitry, etc.).

By way of example, the UEs 101A . . . 101N, 103, and service provider 107 can communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
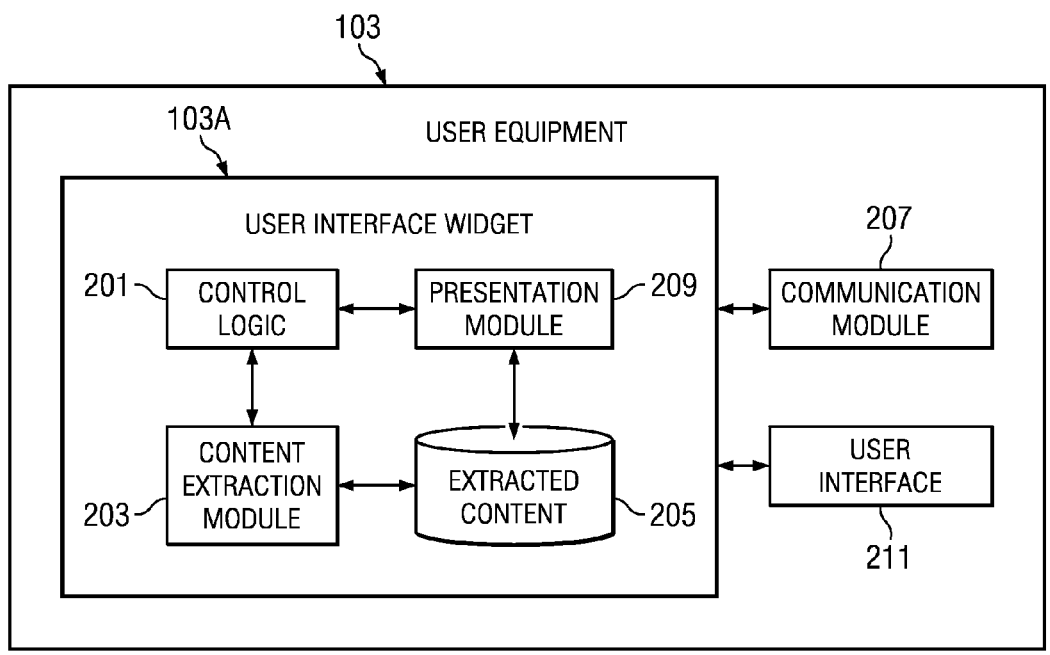
FIG. 2 is a diagram of the components of user equipment including a user interface widget, according to one embodiment.

FIG. 2 is a diagram of the components of user equipment including a user interface widget, according to one embodiment. By way of example, the user interface widget 103A includes a control logic 201 that controls the widget, a content extraction module 203, which can locate various data relating to the operation of the widget that can either be locally stored on the UE 103 or remotely, for example, on UE 101A or service provider 107, and an extracted content database 205 for storing such data. If data is needed from remote sources, then the content extraction module 203 can utilize the communication module 207 to retrieve such data. Also, the user interface widget 103A includes a presentation module 209 that can determine how to present the user interface display, for example, in combination with the user interface 211 of the UE 103.

Figure 4A:
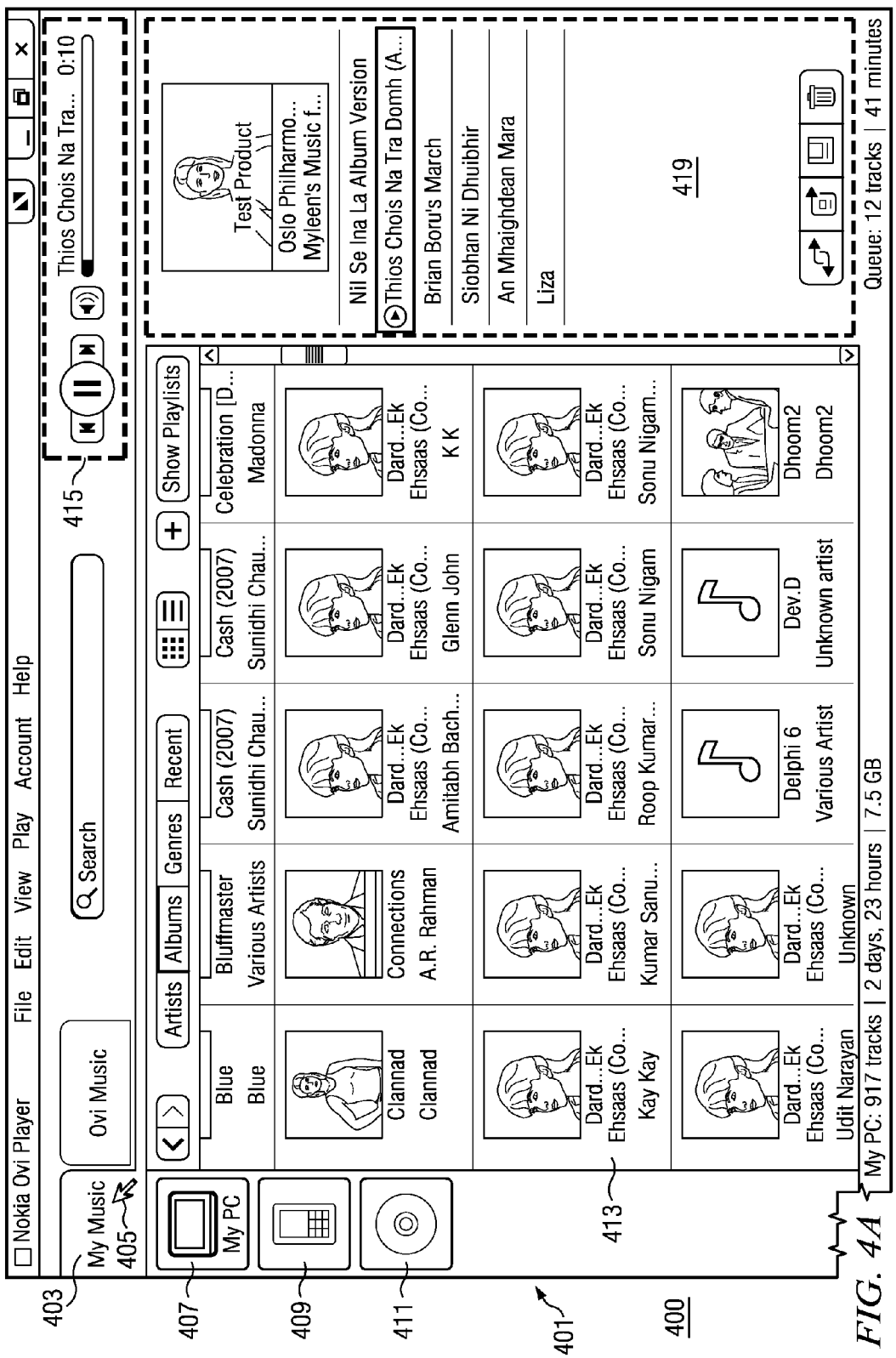
FIG. 4A is a diagram of a user interface display of a first window utilized in the processes of FIG. 3A, according to various embodiments.
Figure 4B:
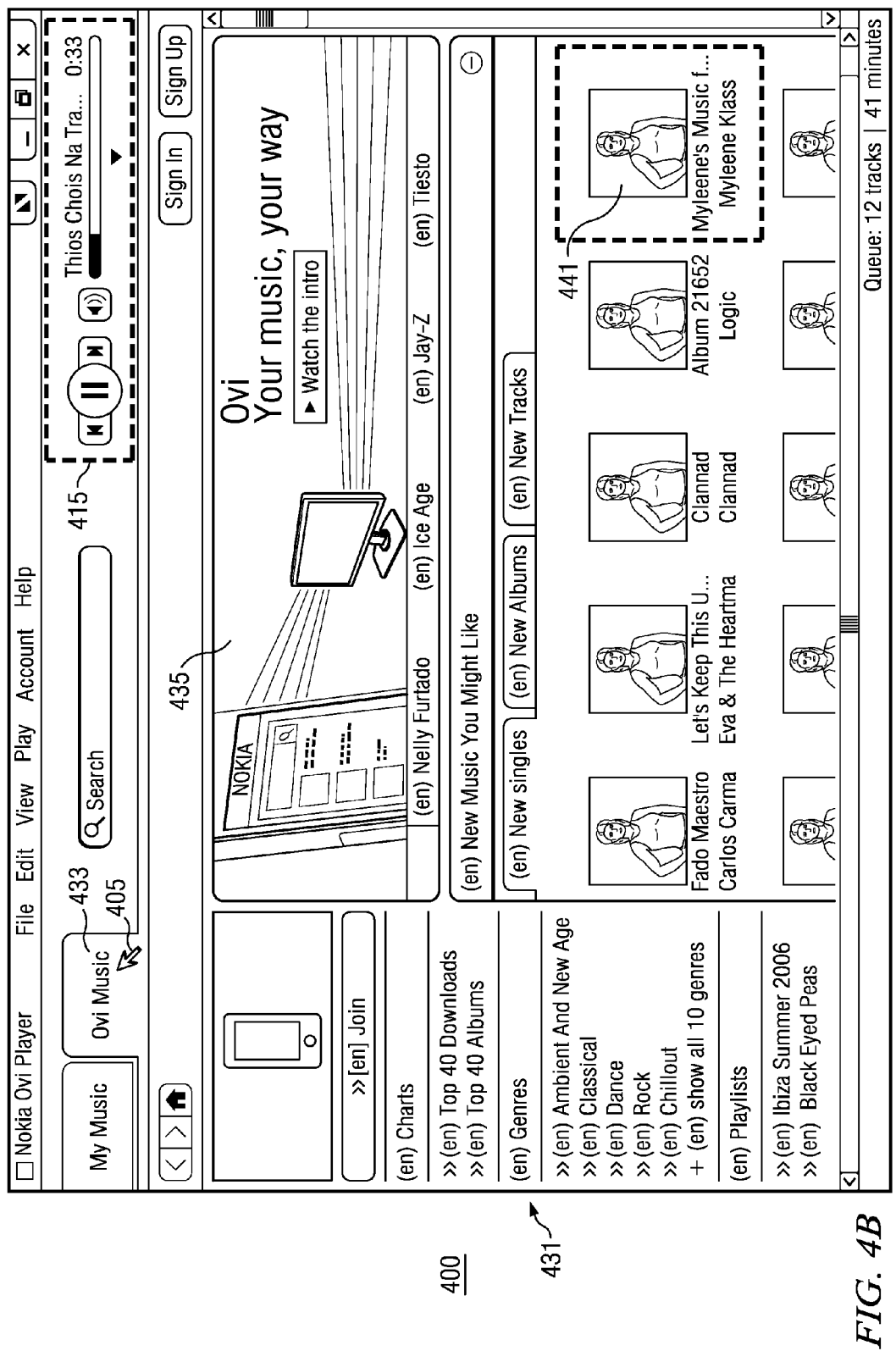
FIG. 4B is a diagram of a user interface display of a second window utilized in the processes of FIGS. 3A and 3B with a collapsed status display, according to various embodiments.
Figure 4C:
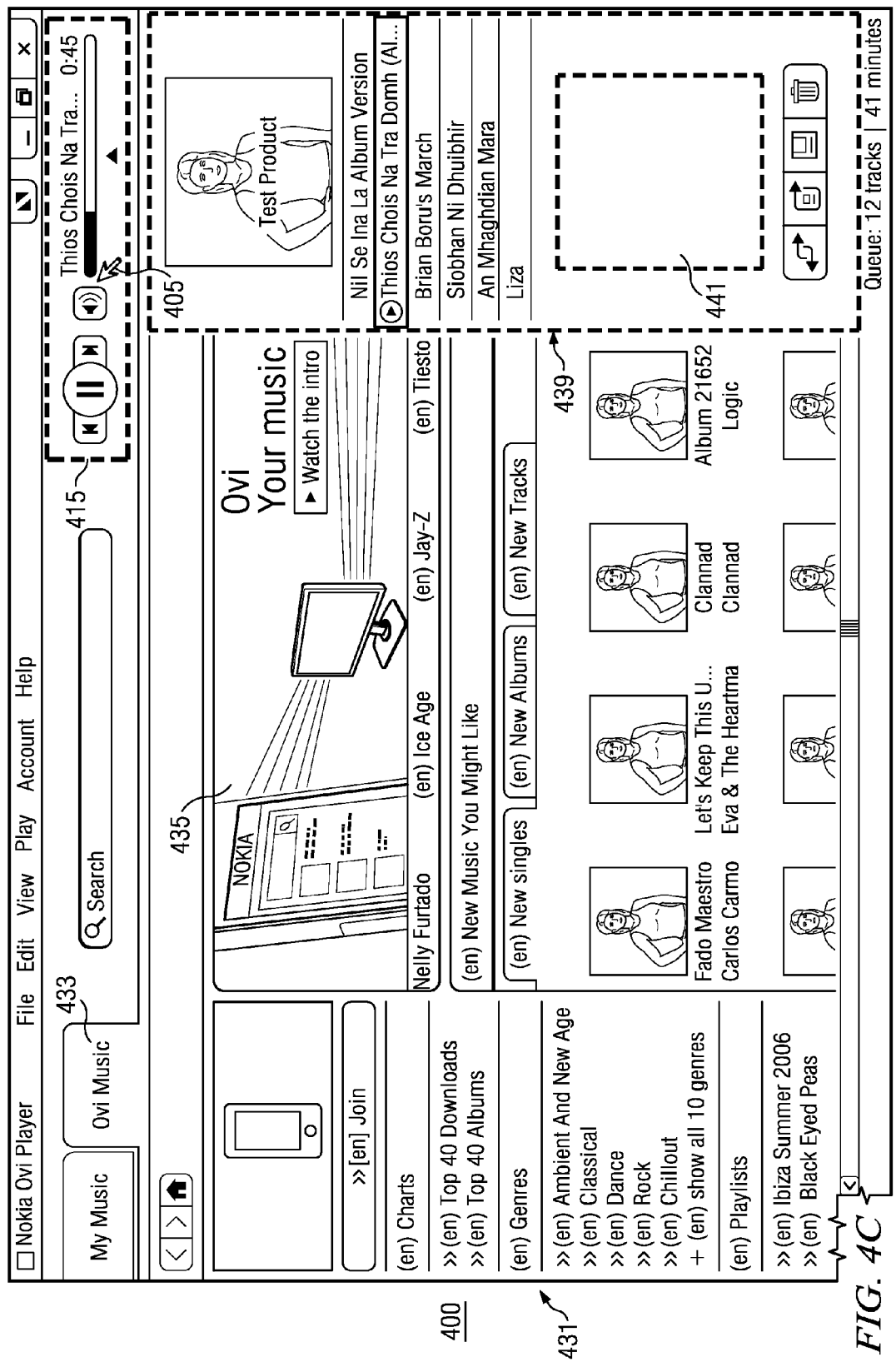
FIG. 4C is a diagram of a user interface display of the second window utilized in the processes of FIGS. 3A and 3B with an expanded status display, according to various embodiments.

FIG. 3A is a flowchart of a process for providing a user interface display having a first window and a second window, according to one embodiment. FIG. 3B is a flowchart of a process for providing a display of the second window of FIG. 3A, according to one embodiment. In one embodiment, the user interface widget (e.g., 103A, 109, and/or 111) performs the processes 300 and 320, and is implemented in, for instance, a chip set including a processor and a memory as shown FIG. 8. FIG. 4A is a diagram of a user interface display of a first window utilized in the processes of FIG. 3A, according to various embodiments. FIG. 4B is a diagram of a user interface display of a second window utilized in the processes of FIGS. 3A and 3B with a collapsed (or non-visible) status display, according to various embodiments. FIG. 4C is a diagram of a user interface display of the second window utilized in the processes of FIGS. 3A and 3B with an expanded (or visible and transparent, semi-transparent, etc.) status display, according to various embodiments.

In step 301, a user interface display 400 is provided with a first window 401 that includes a first predefined area of information 415 that is defined to present a status display control and in step 303 a second predefined area of information 419, such as the floating window/panel/pane/widget, is provided that is separately defined in the first window that is defined to present a status display related to the status display control. Thus, as shown in FIG. 4A, a tab 403 labeled "My Music" is selected using the mouse cursor 405 or other selection tool, which opens the first window 401. Additional source tabs are provided, such as "My PC" tab 407 (currently selected), mobile device tab 409, and compact disk (CD) tab 411, which are used to select the particular source of data shown in a center pane 413. In this configuration, a user can utilize the status display control in area 415 and/or the status display in area 419 to control the current music in the playback queue and to view data relating to the playback and/or music in the queue. The user can also select items in the center pane 413 to choose the music in the current playback queue and then control playback using areas 415 and/or 419.

In step 305, the user interface display 400 is provided with a second window 431 that includes the first predefined area 415 that is defined to present the status display control, and in step 307 a third area 439 is provided that transparently presents the floating window/panel/pane/widget, such as the status display, over content 441 in the second window upon selection of the status display control. Thus, as shown in FIGS. 4B and 4C, a tab 433 labeled "Ovi Music" is selected using the mouse cursor 405 or other selection tool, which opens the second window 431, which is a web-based store that allows a user to select and download music and other content to the user's user equipment. Therefore, in order to provide the user with an improved, widened display of the content for sale at the store, the status display is advantageously not shown by default. Thus, the user can easily see all of the content, such as content 441 that is shown on pane 435 in the second window 431. The status display control 415 is shown in the first predefined area, and if the user selects the status display control 415, (e.g., by moving the cursor 405 over the status display control 415, etc.) then the status display is shown in the third area 439 in a transparent, semitransparent and/or floating manner over content, such as content 441 as shown in FIG. 4C. Thus, the status display 439 can be displayed without reducing the amount of size of content shown in the store pane 435, and without doing any or minimal Central Processing Unit (CPU) processing relating to the display of the store pane 435. In this configuration, the user can then utilize the status display control in area 415 and/or the status display in area 439 to control the current music in the playback queue and to view data relating to the playback and/or music in the queue.

In step 321 of process 320, the user interface display is provided with the second window without display of the status display in the third area, for example, as seen in FIG. 4B. Upon receipt of user input regarding selection of the status display control, such as by moving the mouse cursor over the area 415, the status display is transparently presented in a floating manner in the third area 439 over content in the second window upon receipt of the user input in step 323 and as shown in FIG. 4C. In step 325, the transparent presenting of the status display in the third area over content in the second window is continued while the status display control and/or the transparently displayed status display is selected via user input (e.g., as shown in FIG. 4C), and in step 327 the user interface display is provided with the second window without display of the status display in the third area when the status display control and/or the transparently displayed status display is no longer selected via user input (e.g., as shown in FIG. 4B), for example, when the user moves the mouse cursor away from both areas 415 and 439.

Figure 5A:
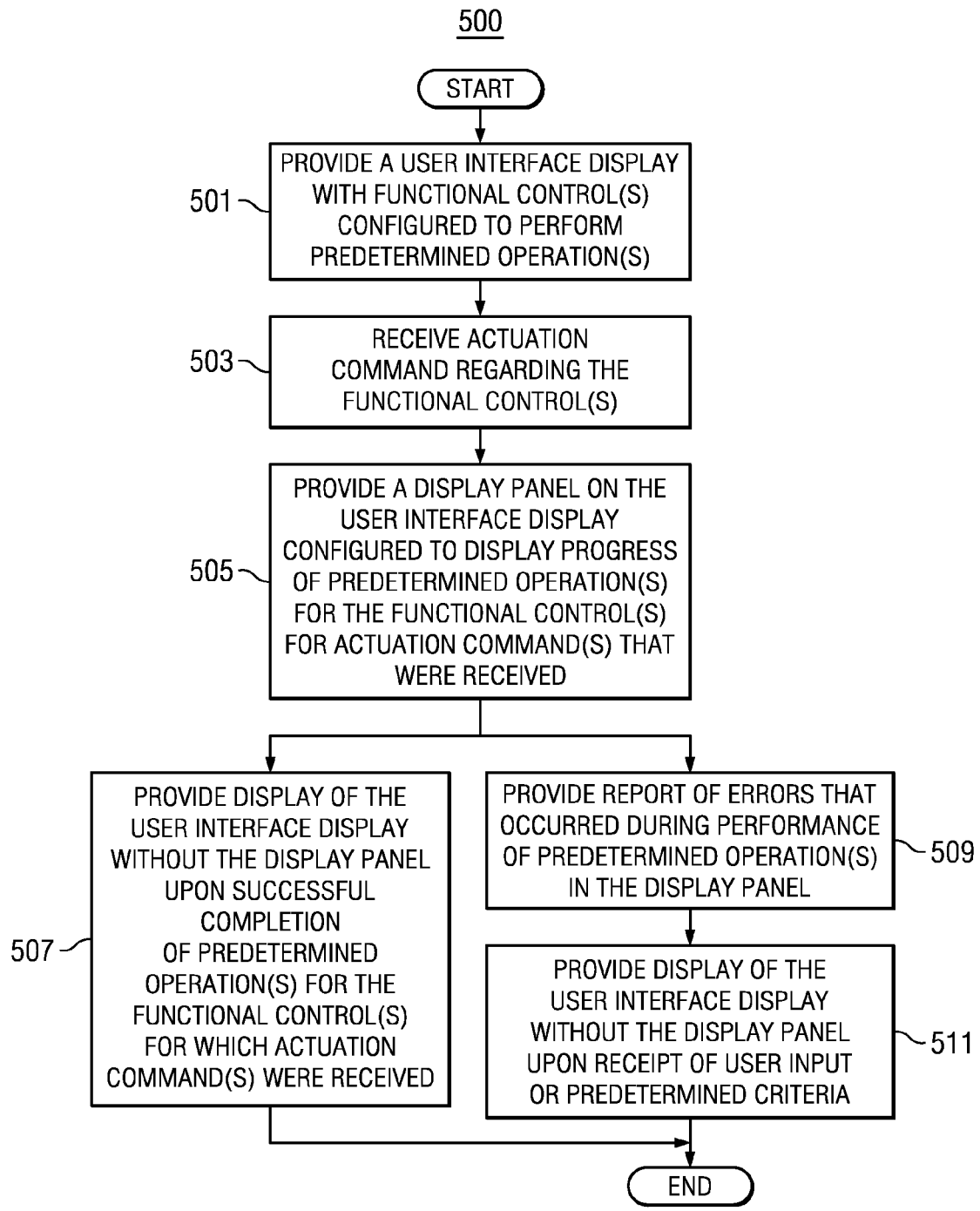
FIG. 5A is a flowchart of a process for providing a user interface display having a display panel for displaying progress of operations, according to one embodiment.
Figure 5B:
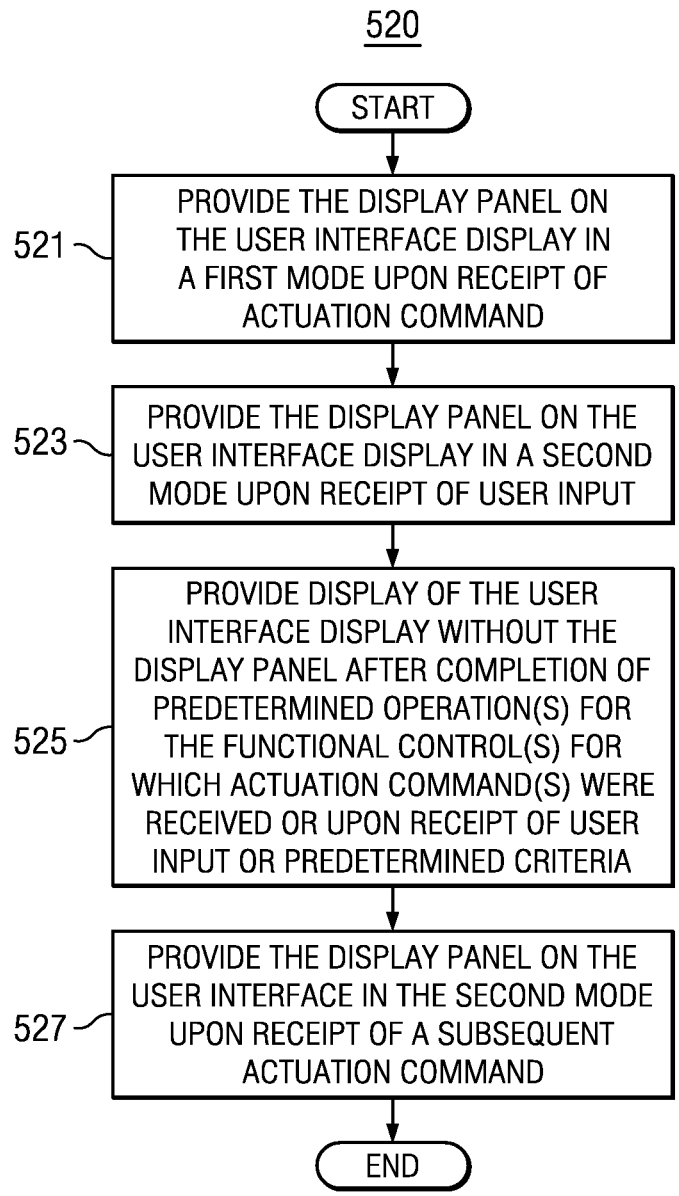
FIG. 5B is a flowchart of a process for allowing adjustment of the display panel, according to one embodiment.

FIG. 5A is a flowchart of a process for providing a user interface display having a display panel for displaying progress of operations, according to one embodiment. FIG. 5B is a flowchart of a process for allowing adjustment of the display panel, according to one embodiment. In one embodiment, the user interface widget (e.g., 103A, 109, and/or 111) performs the processes 500 and 520, and is implemented in, for instance, a chip set including a processor and a memory as shown FIG. 8. FIGS. 6A-6H are diagrams of a user interface display configured to provide a display panel in various collapsed (see, e.g., FIGS. 6A and 6H) and expanded (see, e.g., FIGS. 6B-6G) states, according to various embodiments.

In step 501, a user interface display 600 is provided with a functional control configured to perform a predetermined operation. For example, the user interface display 600 can include a window 601 with various controls and menu selections that allow a user to, for example, transfer data such as music, download data, import data, modify/optimize data such as album artwork, etc. For example, a user could select from a center pane 603 an album icon 607 and transfer that album from the user's computer to the user's mobile device, for example, by dragging the icon 607, which is currently in the user's My PC library to the mobile device tab. The user interface display 600 is shown which no such functional controls are actuated, and thus the display 600 does not include a progress display panel, thereby advantageously providing the user with a large and uncluttered center pane 603.

Figure 6A:
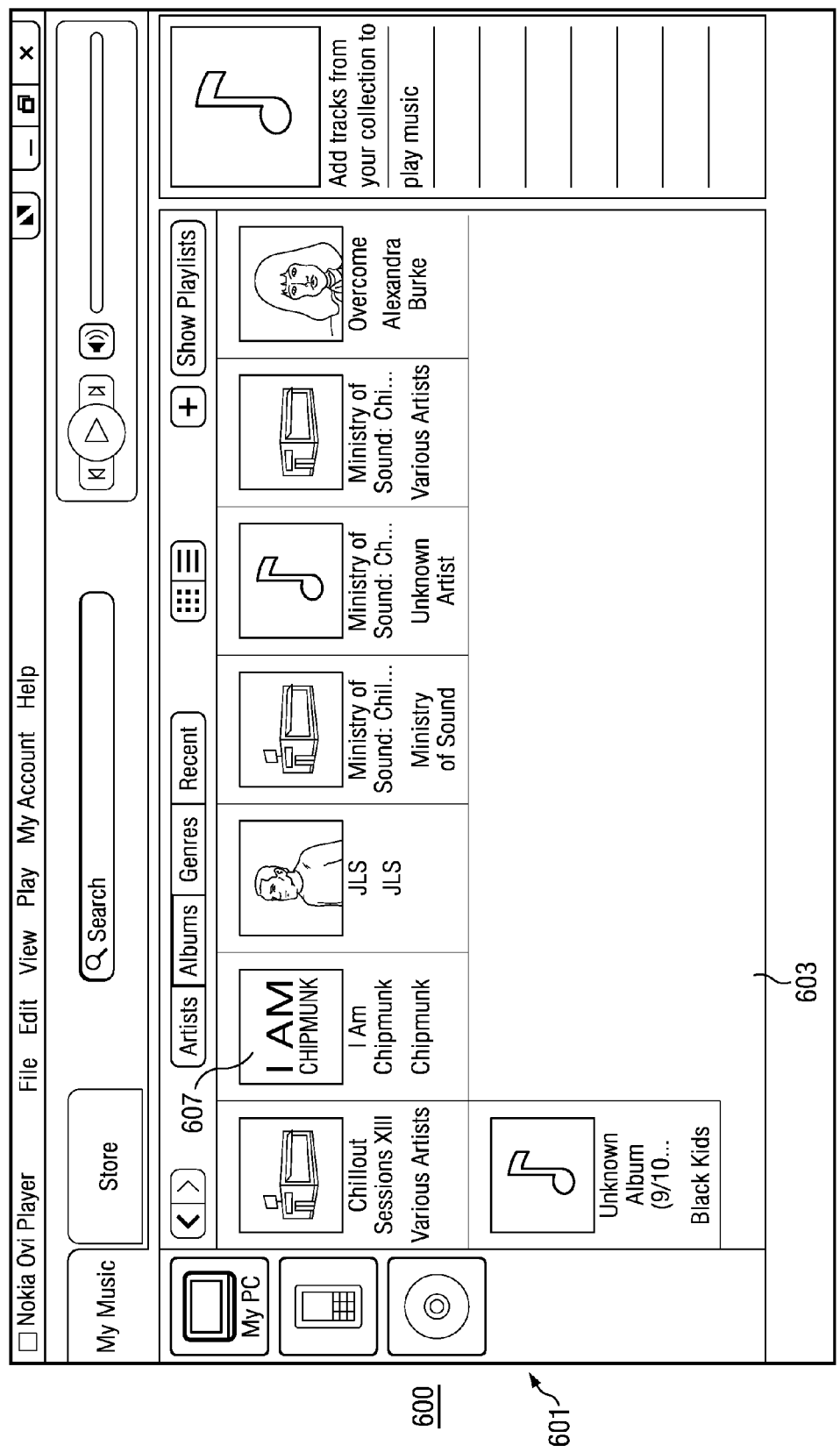
FIGS. 6A-6H are diagrams of a user interface display configured to provide a display panel in various collapsed and expanded states, according to various embodiments.
Figure 6B:
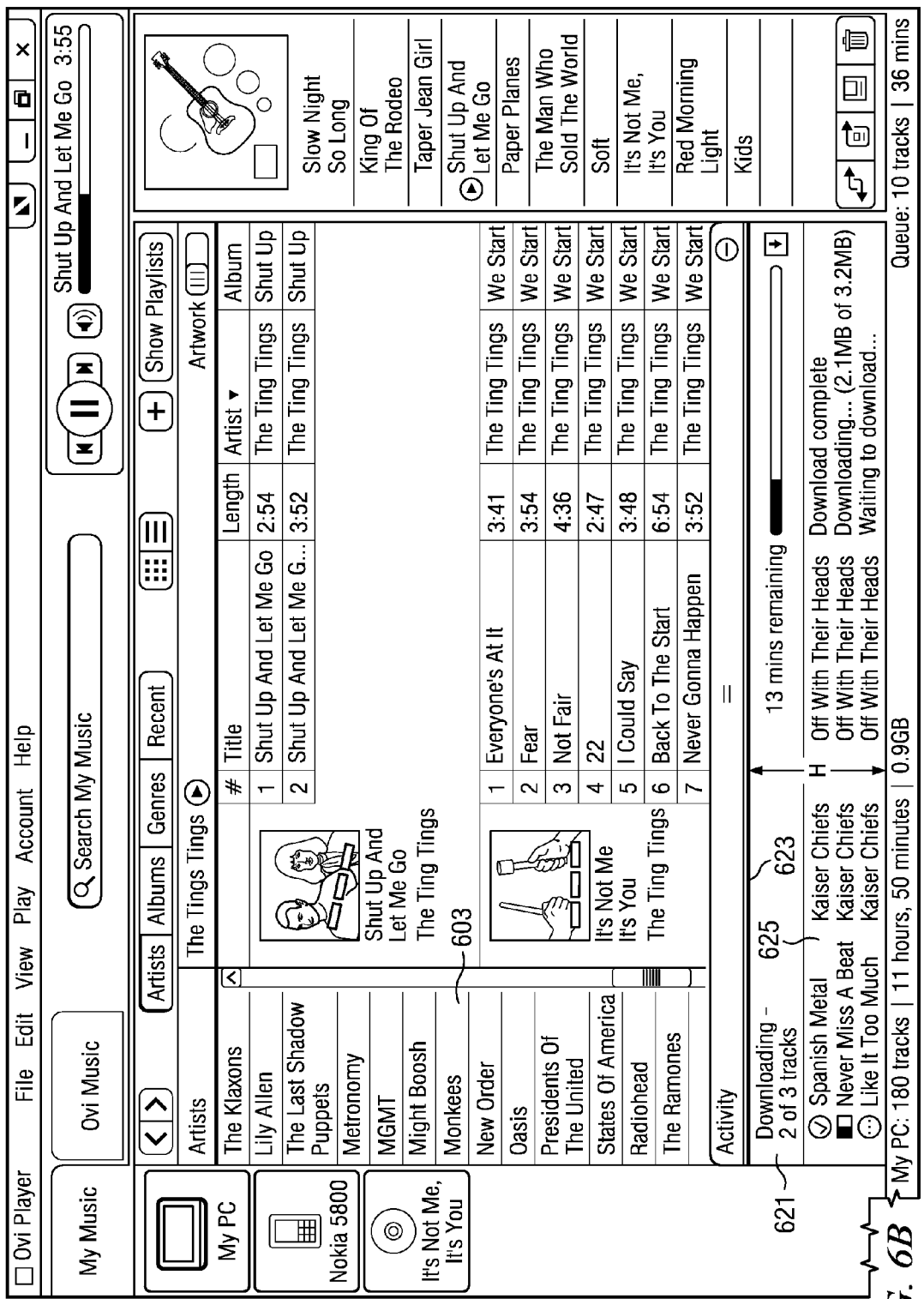
Figure 6C:
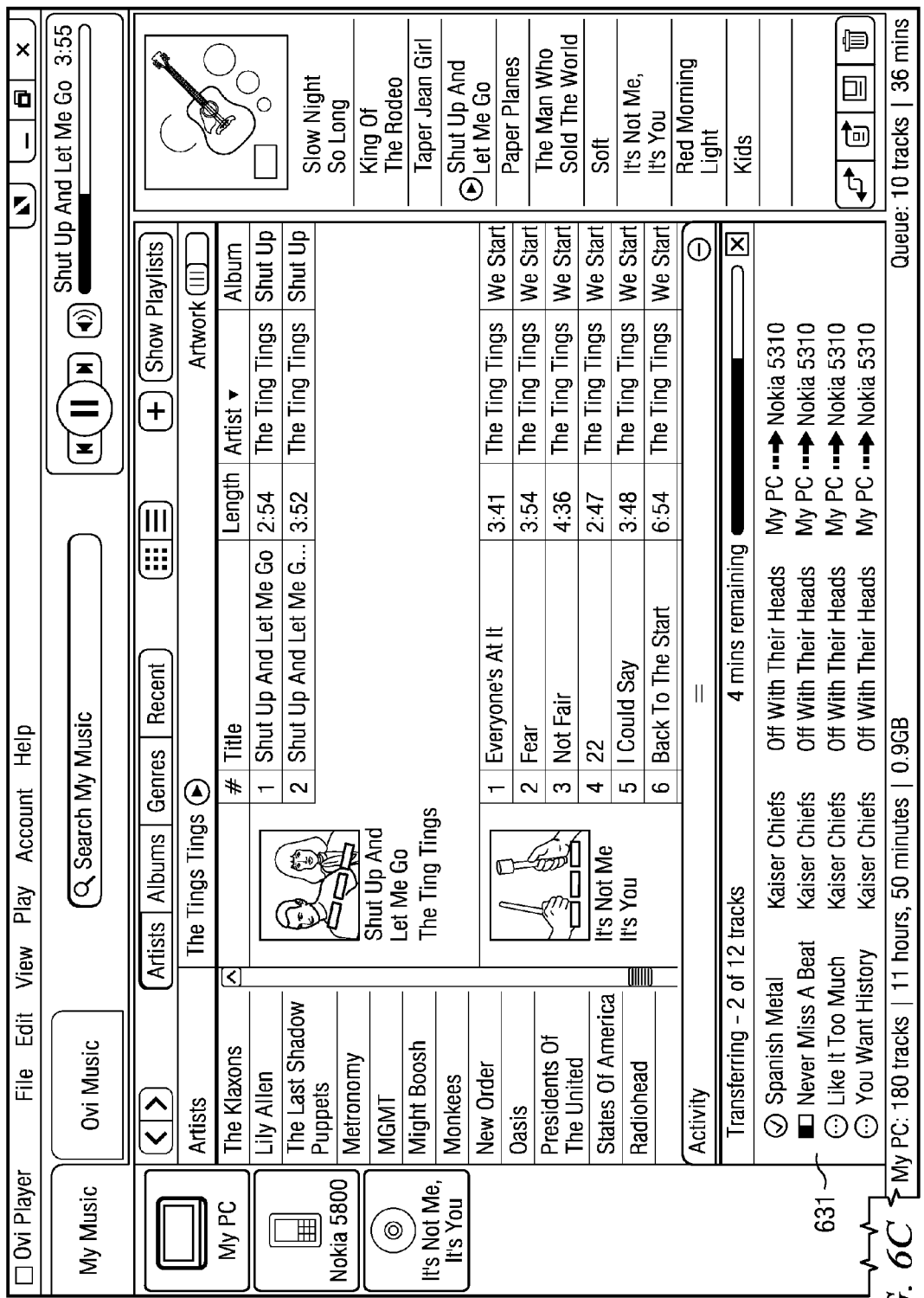
Figure 6D:
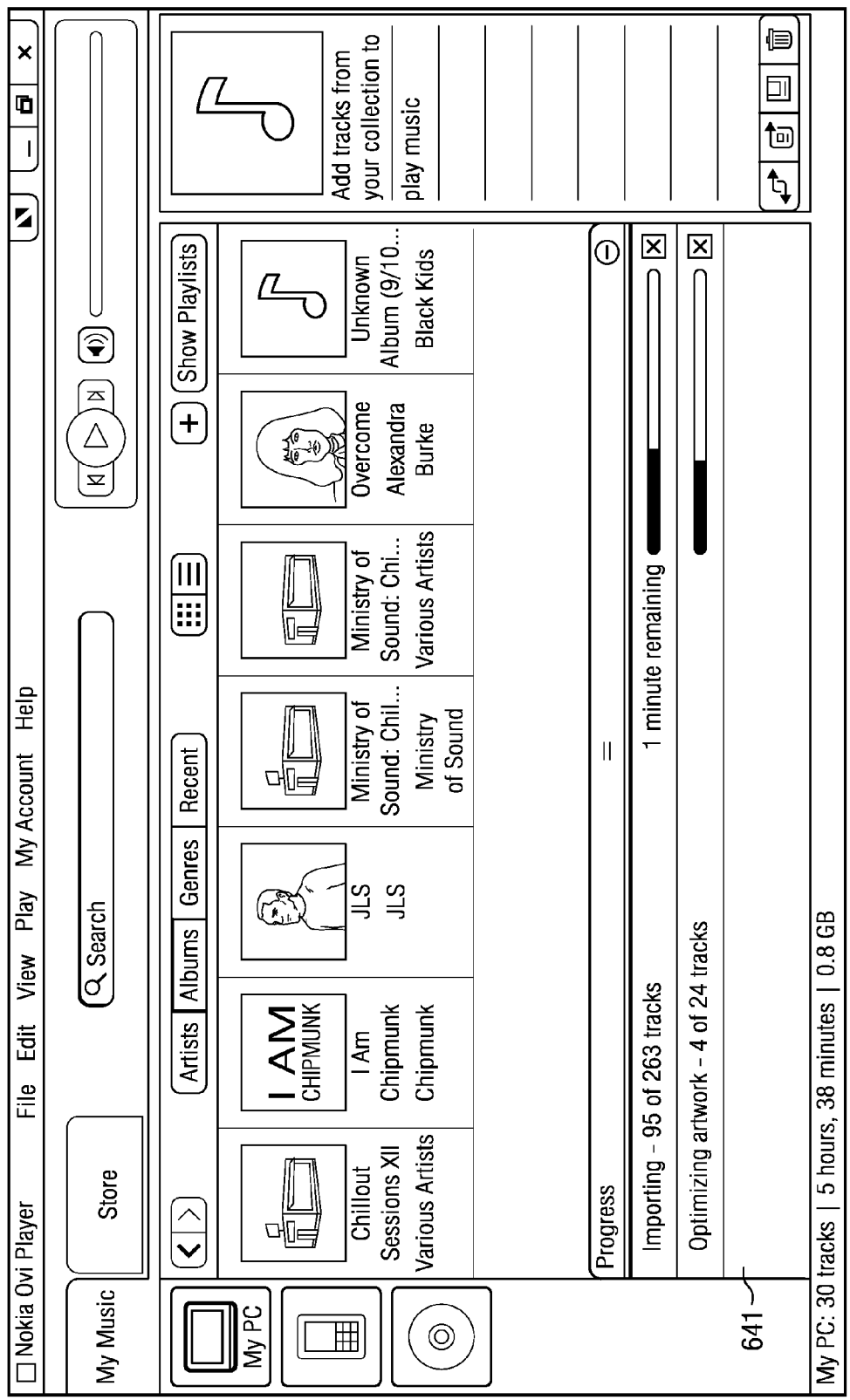
Figure 6E:
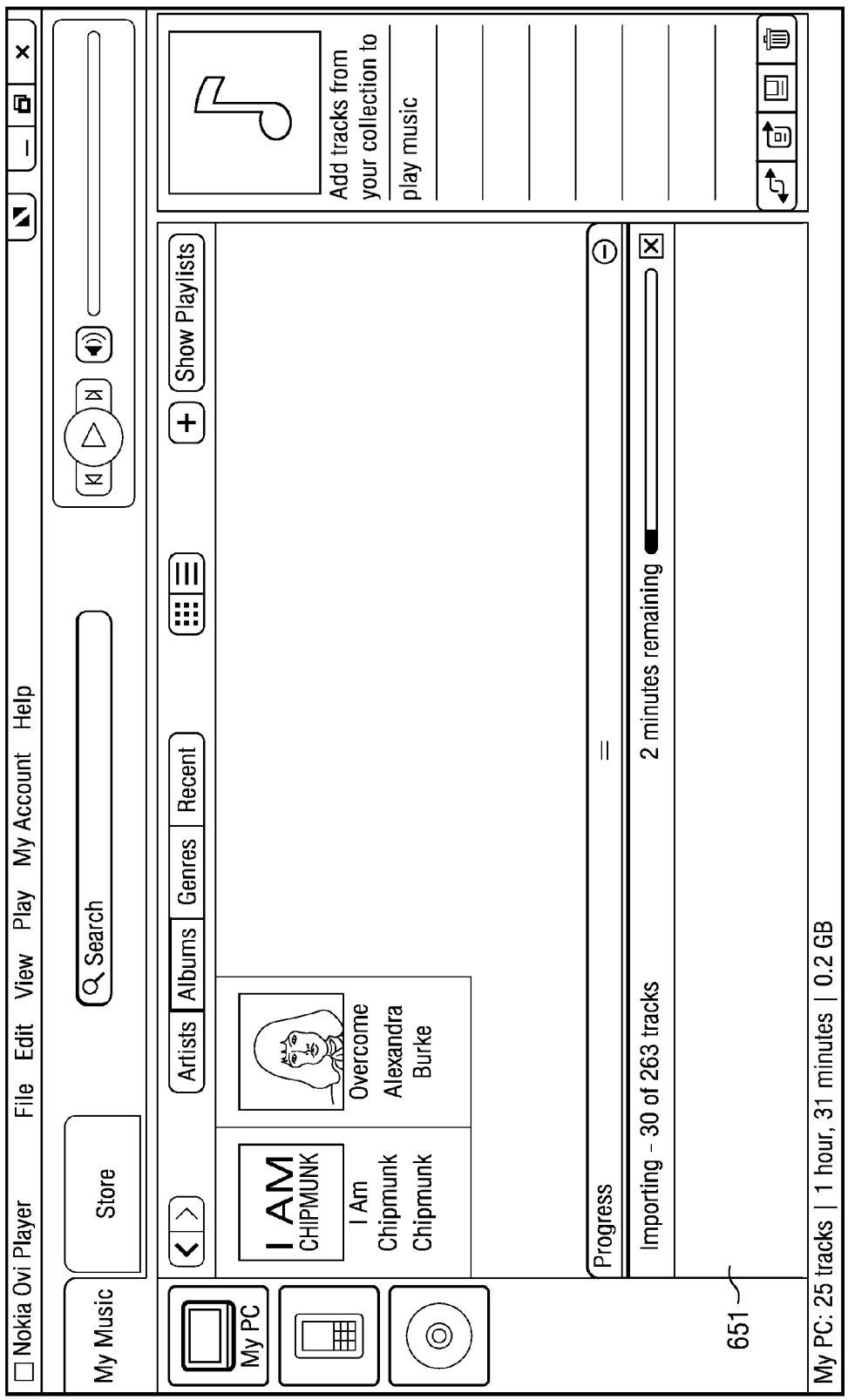
Figure 6F:
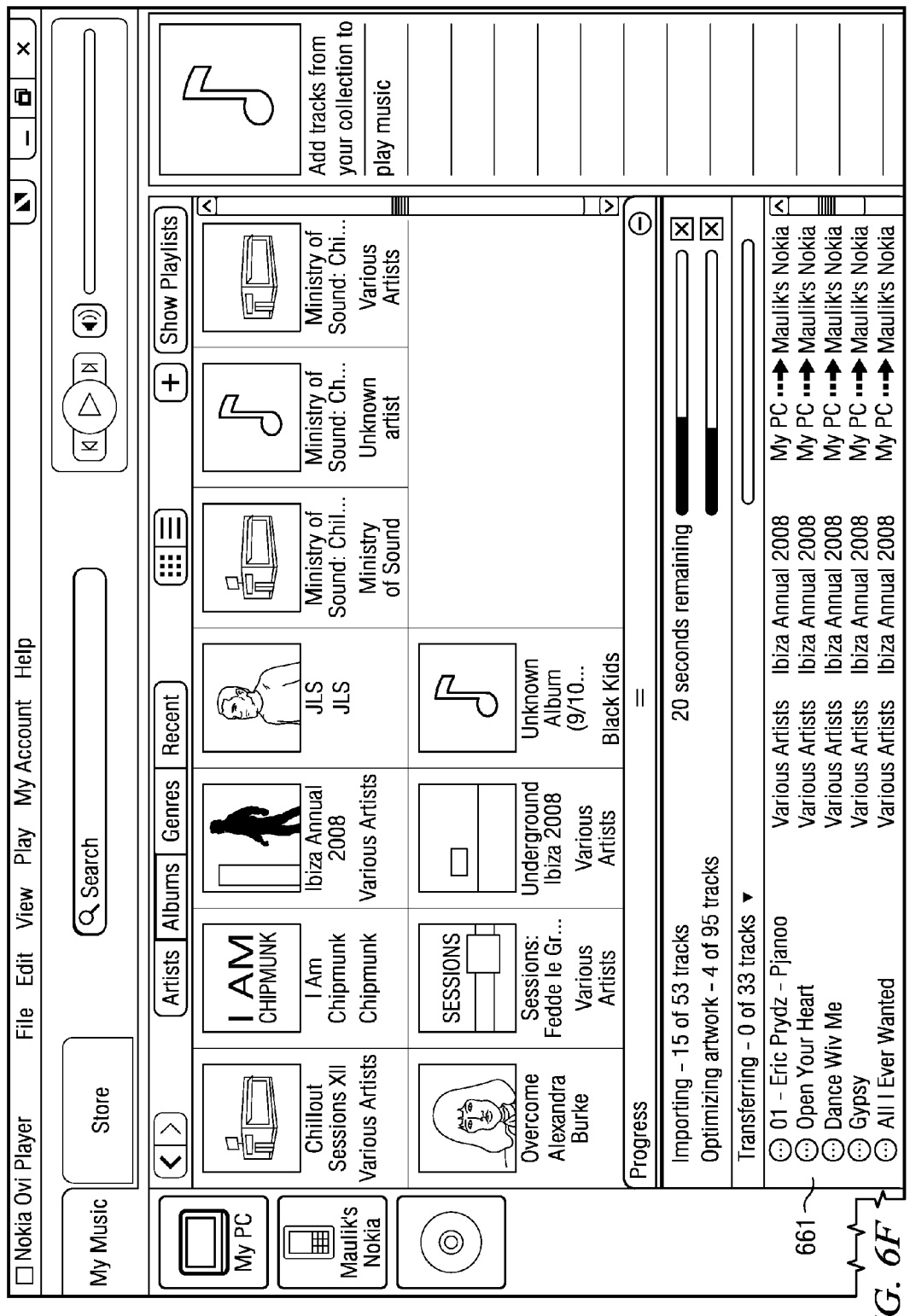
Figure 6G:
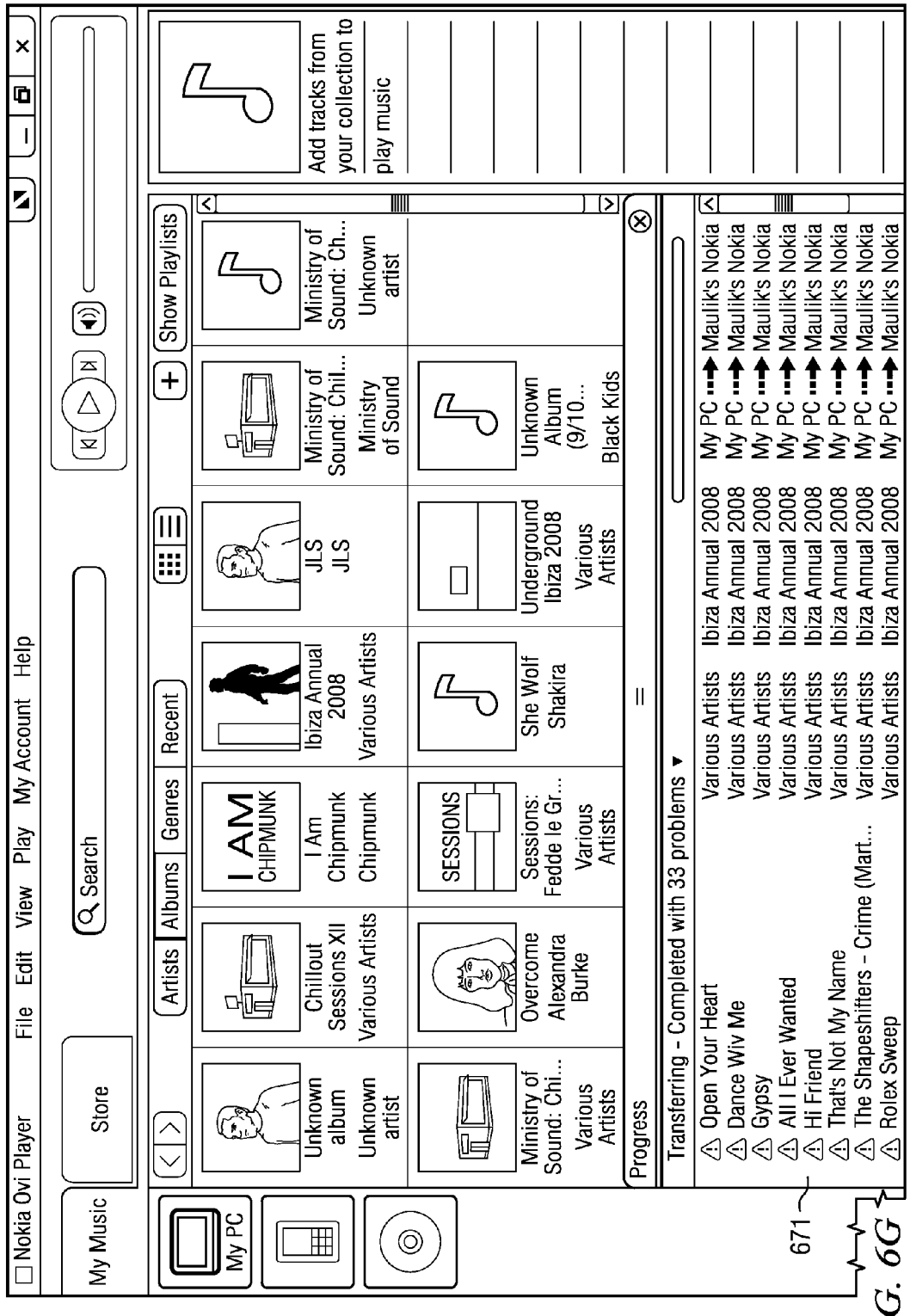
Figure 6H:
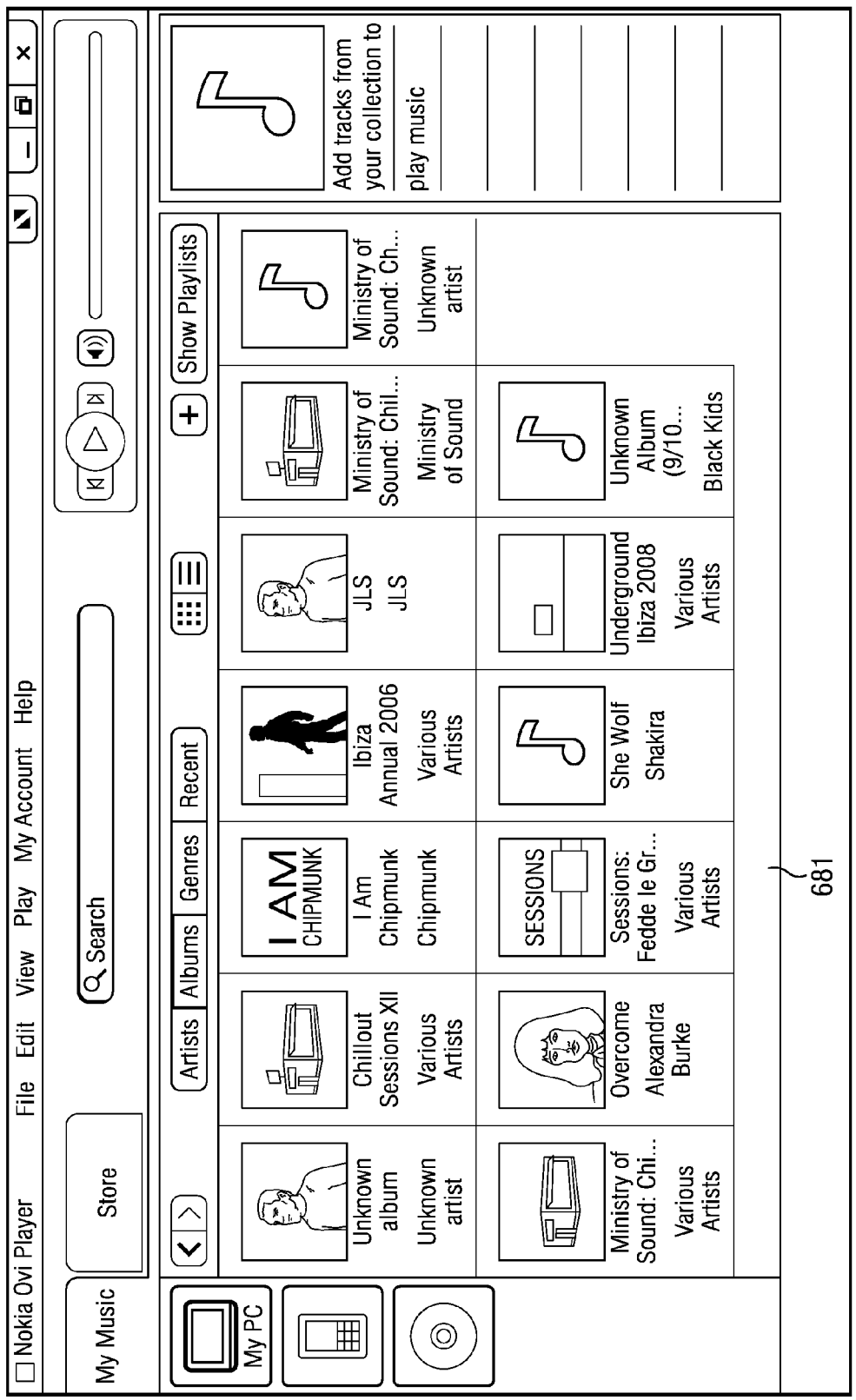

In step 503, an actuation command is received regarding the functional control. For example, the user can utilize a mouse cursor and various controls on the user interface display 600 to actuate a functional control, and thus an actuation command will be generated to begin performance of the function. In step 505, a display panel is provided on the user interface display 600 that is configured to display progress of the predetermined operation for the functional control for the actuation command that was received. Examples of such display panels are shown in FIGS. 6B-6G, as panels 621, 631, 641, 651, 661, and 671. Then, the user interface display 600 can be provided without display of the display panel once it is no longer active, as can be seen in FIG. 6H at bottom 681 and in FIG. 6A. In step 507, the user interface display 600 can be provided without display of the display panel upon completion (e.g., successful completion) of the predetermined operation for the functional control for the actuation command that was received. Alternatively, in step 509, an error report (see, e.g., in panel 671 in FIG. 6G) can be provided in the display panel of errors that occurred during performance of the predetermined operation, and in step 511, the user interface display 600 can be provided without display of the display panel upon receipt of user input (e.g., closing the panel) or predetermined criteria (e.g., upon closing of the widget, after predetermined time period, preset user preference, etc.).

In step 521 of process 520, the display panel of the user interface display 600 is provided in a first mode upon receipt of the actuation command, for example, the display panel is shown in a preset size or shape within the window of the user interface display. In step 523, the display panel is provided in a second mode upon receipt of user input, for example, if the user uses the mouse cursor to resize or reshape the display panel. Then, in step 525, the user interface display is provided without the display panel, and in step 527, when a subsequent actuation command regarding a functional control is received, the display panel is provided on the user interface display in the second mode upon receipt of the subsequent actuation command. Thus, any changes that the user makes to the size, shape, etc. to the display panel is stored and utilized the next time that the display panel is activated.

As noted above, FIGS. 6B-6G show various forms in which the display panel can take on the user interface display. FIG. 6B shows a display panel 621 that includes a header 623 and a panel 625 in which various details regarding the progress of the function can be displayed. The display panels are provided with a height H that can be dependent upon the amount of description needed to summarize the progress or can be set by the user using a mouse cursor or otherwise setting a user preference. The height H is preferably minimized in order to provide the user with the largest amount of space to display the center pane 603 as possible. The display panel can either be provided with a collapsible/expandable separate area within the window, or can be provided transparently or semi-transparency in a floating manner above the content in the center pane 603 so that the content remains visible through the display panel in a manner similar to the floating status display described above.

FIG. 6B shows a display panel 621 that includes progress information regarding downloading functions that are being performed. FIG. 6C shows a display panel 631 that includes progress information regarding transferring functions that are being performed. FIG. 6D shows a display panel 641 that includes progress information regarding importing functions that are being performed and optimization functions that are being performed. FIG. 6E shows a display panel 651 that includes progress information regarding importing functions that are being performed. FIG. 6F shows a display panel 661 that includes progress information regarding importing, optimizing, and transferring functions that are being performed in parallel and/or in series. FIG. 6G shows a display panel 661 that includes progress information regarding transferring functions that have been completed with problems and an error report of such problems. And FIG. 6H shows the user interface display of FIG. 6G after the display panel including the error report has been minimized, collapsed, or closed, such that bottom area 681 is empty.

Note that while the processes disclosed herein can be used to provide a user interface display on any type of user equipment, and that the user display interface widget(s) utilized to provide such a display can be provided on the user equipment and/or on a server.

The processes described herein for providing improved user interface displays may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
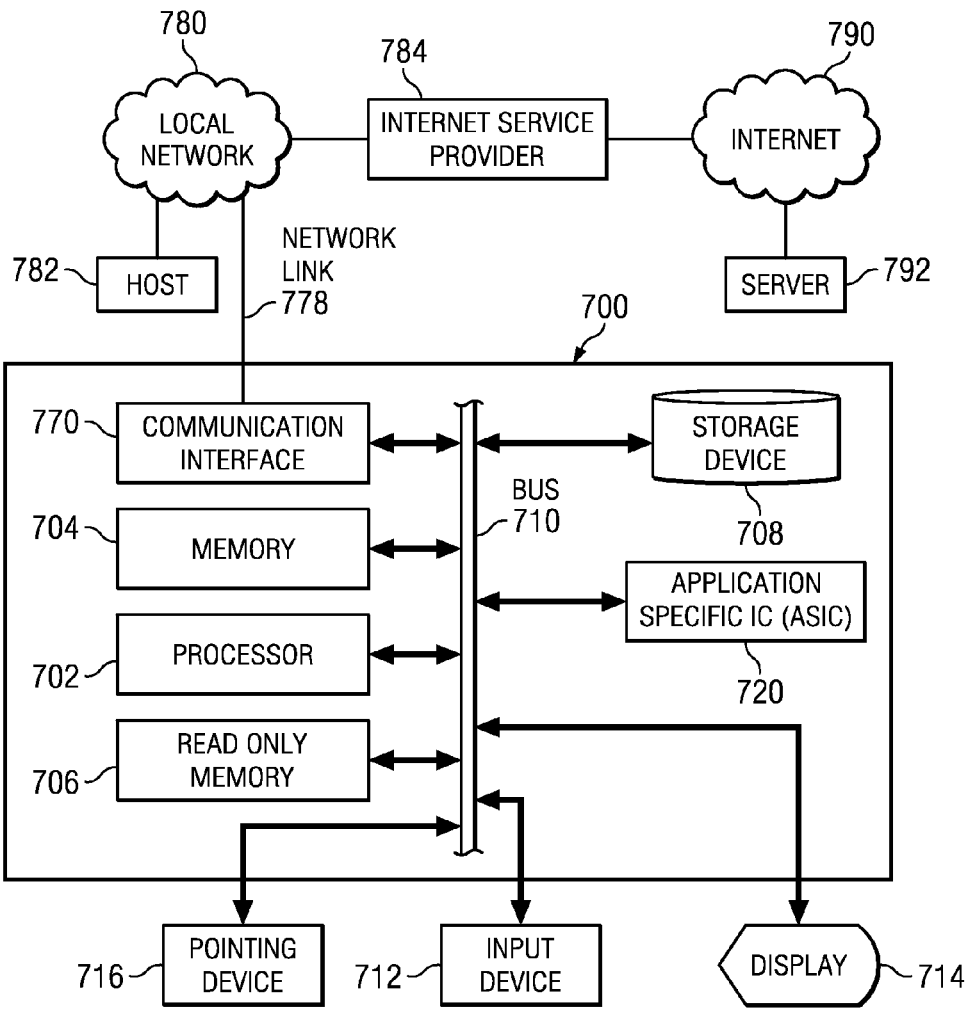
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide improved user interface displays as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing improved user interface displays.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to provide improved user interface displays. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for improved user interface displays. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for improved user interface displays, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing improved user interface displays to the UE 101A and/or 103.

The term "computer-readable medium" as used herein to refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
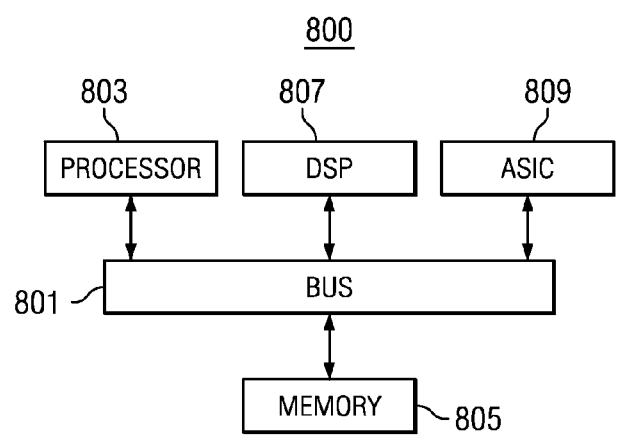
FIG. 8 is a diagram of a chip set that can be used to implement an embodiment of the invention.

FIG. 8 illustrates a chip set 800 upon which an embodiment of the invention may be implemented. Chip set 800 is programmed to provide user interface displays as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of providing improved user interface displays.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide improved user interface displays. The memory 805 also stores the data associated with or generated by the execution of the inventive steps.

Figure 9:
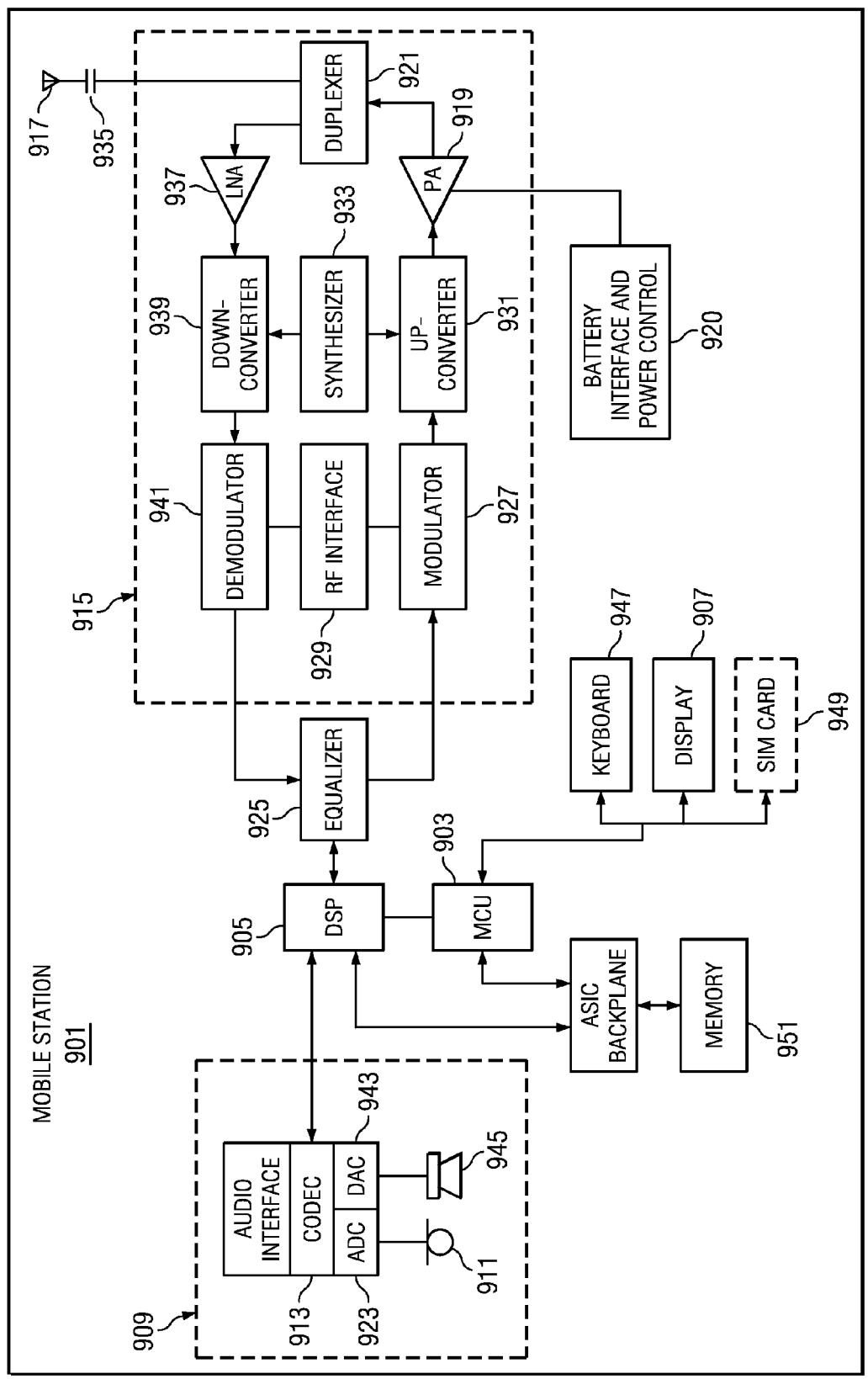
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of providing improved user interface displays. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing improved user interface displays. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission through the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide improved user interface displays. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
providing on a user device a user interface display with a first window that includes, a first predefined area that is defined to present a status display control including one or more media playing control function of the user device and a second predefined area that is separately defined in the first window to present a status display presenting progress of media playing together with progress of one or more media control functions including one or more downloading functions, one or more importing functions, one or more optimizing functions, one or more transferring functions, or a combination thereof that are being performed on the user device, wherein the progress of the one or more media control functions include a function progress indicator and one or more item progress indicators, the status display control presents one or more playback controls, the status display presents a playback list, and some of the one or more media control functions are performed in series;
providing on the user device a second window that includes the first predefined area;
upon selection of one of the playback controls of the status display control in the second window, initiating at least a semi-transparent presentation of the status display in a floating manner in a third area over content in the second window while maintaining a display size of the content in the second window;
initiating one or more modifications to the selected playback control of the status display control based on user interaction with one or more elements of the playback list of the semi-transparently displayed status display in the third area; and providing the user interface display with the second window without displaying the status display in the third area when the semi-transparently displayed status display is no longer selected.

2. A method of claim 1, further comprising:

upon receipt of a first user input in the first window regarding the content, providing the user interface display with the second window initially without display of the status display in the third area, wherein the content is not subject to the status display control; and receiving a second user input in the second window regarding the selection of the status display control, wherein the semi-transparent presentation of the status display in the third area over the content in the second window is based upon receipt of the second user input, and wherein some of the one or more media control functions are different media control functions performed in parallel, and progress of each of the different media control functions are presented in the second predefined area concurrently.

3. A method of claim 2, further comprising:

continuing the semi-transparent presentation of the status display in the third area over the content in the second window while the status display control and/or the semi-transparently displayed status display is selected via a third user input, wherein the user interface display is provided with the second window without display of the status display in the third area when the status display control and/or the semi-transparently displayed status display is no longer selected via the third user input, and the first window includes content of an online media store, and the third area presents the status display over the content of the online media store in the second window.

4. A method of claim 1, wherein the status display presents a progress pane, wherein sizing of the first window, the second window, or a combination thereof is adjusted based on a status of the progress pane without user intervention.

5. A method of claim 1, wherein the status display is displayed without altering a display size of the third area, wherein the display location of the at least one interactive element of the status display control is modified to be outside of the third area, wherein the function progress indicator includes a function executing time indicator, a function complete proportion indicator, or a combination thereof, and wherein the one or more item progress indicators include graphic indicators of completion, in progress, and waiting.

6. An apparatus comprising:

at least one processor; and at least one memory including computer program code for one or more programs, the at least one memory and the computer program code configured to, with the at least one processor, cause the apparatus embedded in a user device to perform at least the following, provide on the user device a user interface display with a first window that includes, a first predefined area defined to present a status display control including one or more media playing control functions of the user device and a second predefined area that is separately defined in the first window to present a status display presenting progress of media playing together with progress of one or more media control functions including one or more downloading functions, one or more importing functions, one or more optimizing functions, one or more transferring functions, or a combination thereof that are being performed on the user device, wherein the progress of the one or more media control functions include a function progress indicator and one or more item progress indicators, the status display control presents one or more playback controls, the status display presents a playback list, and some of the one or more media control functions are performed in series;

provide on the user device a second window that includes the first predefined area;

upon selection of one of the playback controls of the status display control in the second window, initiate at least a semi-transparent presentation of the status display in a floating manner in a third area over content in the second window while maintaining a display size of the content in the second window;

initiate one or more modifications to the selected playback control of the status display control based on user interaction with one or more elements of the playback list of the semi-transparently displayed status display in the third area; and provide the user interface display with the second window without displaying the status display in the third area when the semi-transparently displayed status display is no longer selected.

7. An apparatus of claim 6, wherein the apparatus is further caused to:

upon receipt of a first user input in the first window regarding the content, provide the user interface display with the second window initially without display of the status display in the third area; and receive a second user input regarding selection of the status display control, wherein the semi-transparent presentation of the status display in the third area over the content in the second window is based upon receipt of the second user input.

8. An apparatus of claim 7, wherein the apparatus is further caused to:

continue the semi-transparent presentation of the status display in the third area over content in the second window while the status display control and/or the semi-transparently displayed status display is selected via a third user input, wherein the user interface display is provided with the second window without display of the status display in the third area when the status display control and/or the semi-transparently displayed status display is no longer selected via the third user input.

9. An apparatus of claim 6, wherein the apparatus is a mobile phone further comprising:

user interface circuitry and user interface software configured to facilitate user control of at least some functions of the mobile phone through use of a display and configured to respond to user input; and a display and display circuitry configured to display at least a portion of the user interface display of the mobile phone, the display and display circuitry configured to facilitate user control of at least some functions of the mobile phone.

10. An apparatus of claim 6, wherein the apparatus is a computer further comprising:

user interface circuitry and user interface software configured to facilitate user control of at least some functions of the computer through use of a display and configured to respond to user input; and a display and display circuitry configured to display at least a portion of the user interface display of the computer, the display and display circuitry configured to facilitate user control of at least some functions of the computer.

11. An apparatus of claim 6, wherein the status display control presents one or more control functions, and the status display presents a progress pane, wherein sizing of the first window, the second window, or a combination thereof is based on a status of the progress pane.

12. An apparatus of claim 6, wherein the status displaying is displayed without altering display size of the third area.

13. A non-transitory computer-readable storage medium carrying one or more sequences of one or more instructions which, when executed by one or more processors, cause an apparatus embedded in a user device to at least perform the following steps:

providing on the user device a user interface display with a first window that includes, a first predefined area defined to present a status display control including one or more media playing control functions of the user device and a second predefined area that is separately defined in the first window to present a status display presenting progress of media playing together with progress of one or more media control functions including one or more downloading functions, one or more importing functions, one or more optimizing functions, one or more transferring functions, or a combination thereof that are being performed on the user device, wherein the progress of the one or more media control functions include a function progress indicator and one or more item progress indicators, the status display control presents one or more playback controls, the status display presents a playback list, and some of the one ore more media control functions are performed in series;

providing on the user device a second window that includes the first predefined area;

upon selection of one of the playback controls of the status display control in the second window, initiating at least a semi-transparent presentations of the status display in a floating manner in a third area over content in the second window while maintaining a display size of the content in the second window;

initiating one or more modification to the selected playback control of the status display control based on user interaction with one or more elements of the playback list of the semi-transparently displayed status display in the third area; and providing the user interface display with the second window without displaying the status display in the third area when the semi-transparently displayed status display is no longer selected.

14. A non-transitory computer-readable storage medium of claim 13, wherein the apparatus is caused, at least in part, to further perform:

upon receipt of a first user input in the first window regarding the content, providing the user interface display with the second window initially without display of the status display in the third area;

receiving a second user input regarding selection of the status display control, wherein the semi-transparent presentation of the status display in the third area over the content in the second window is based upon receipt of the second user input.

15. A non-transitory computer-readable storage medium of claim 13, wherein the apparatus is caused, at least in part, to further perform:

continuing the semi-transparent presentation of the status display in the third area over content in the second window while the status display control and/or the semi-transparently displayed status display is selected via a third user input, wherein the user interface display is provided with the second window without display of the status display in the third area when the status display control and/or the semi-transparently displayed status display is no longer selected via the third user input.

* * * * *